(12) United States Patent
Ohnuma et al.

(10) Patent No.: US 7,997,588 B2
(45) Date of Patent: Aug. 16, 2011

(54) CYLINDER APPARATUS AND STABILIZER APPARATUS USING THE SAME

(75) Inventors: Takashi Ohnuma, Kanagawa (JP); Takao Nakadate, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 168 days.

(21) Appl. No.: 12/382,641

(22) Filed: Mar. 20, 2009

(65) Prior Publication Data

US 2009/0267311 A1 Oct. 29, 2009

(30) Foreign Application Priority Data

Apr. 25, 2008 (JP) ................................. 2008-116214

(51) Int. Cl.
*B60G 17/005* (2006.01)
*B60G 21/05* (2006.01)
*B60G 17/015* (2006.01)
*F16F 9/32* (2006.01)

(52) U.S. Cl. ........... 280/5.519; 280/124.106; 280/5.507; 280/124.16; 188/300; 188/266.2

(58) Field of Classification Search ............ 91/4 R, 91/422; 280/5.507, 5.506, 5.508, 5.511, 280/5.519, 124.106, 124.107, 124.157, 124.158, 280/124.159, 124.16; 188/266, 266.6, 300, 188/266.2, 266.5, 266.1

See application file for complete search history.

(56) References Cited

U.S. PATENT DOCUMENTS

| | | | | |
|---|---|---|---|---|
| 3,559,776 | A * | 2/1971 | Schultze | 188/300 |
| 6,079,526 | A * | 6/2000 | Nezu et al. | 188/266.6 |
| 6,119,829 | A * | 9/2000 | Nakadate | 188/266.6 |
| 6,182,805 | B1 * | 2/2001 | Kashiwagi et al. | 188/266.6 |
| 6,302,248 | B1 * | 10/2001 | Nakadate | 188/266.6 |
| 7,743,896 | B2 * | 6/2010 | Vanhees et al. | 188/322.13 |
| 2008/0035439 | A1 * | 2/2008 | Fox | 188/275 |
| 2008/0078634 | A1 * | 4/2008 | Heyn et al. | 188/266.5 |
| 2009/0267311 | A1 * | 10/2009 | Ohnuma et al. | 280/5.507 |
| 2009/0294230 | A1 * | 12/2009 | Weimann | 188/266.6 |
| 2010/0276906 | A1 * | 11/2010 | Galasso et al. | 280/283 |

FOREIGN PATENT DOCUMENTS

| | | | | |
|---|---|---|---|---|
| JP | 05042813 | A | * | 2/1993 |
| JP | 2005-178472 | A | | 7/2005 |

\* cited by examiner

*Primary Examiner* — Ruth Ilan
*Assistant Examiner* — Karen A Beck
(74) *Attorney, Agent, or Firm* — Rader, Fishman & Grauer PLLC (57) ABSTRACT

There is provided with a cylinder apparatus comprising: a cylinder; a piston; a piston rod, one end of which is connected to the piston and the other end of which is extended outside; an external cylinder provided at an outer periphery of the cylinder so as to form a reservoir in which to seal the hydraulic liquid and gas therebetween; a base valve dividing the second chamber and the reservoir; a first check valve provided with the piston so as to allow flow of the hydraulic liquid only from the second chamber side to the first chamber side; a second check valve provided with the base valve so as to allow flow of the hydraulic liquid only from the reservoir side to the second chamber side; a flow passage connecting the first chamber with the reservoir; and an opening and closing valve opening and closing the flow passage.

21 Claims, 4 Drawing Sheets

CYLINDER APPARATUS AND STABILIZER APPARATUS USING THE SAME

BACKGROUND OF THE INVENTION

1. Field of the Invention

The present invention relates to a cylinder apparatus that can lock a piston rod and a stabilizer apparatus for conducting roll control for vehicles by using the cylinder apparatus.

2. Description of the Related Art

In suspension apparatuses for vehicles etc., a torsion-bar type stabilizer has been used for roll suppression of a vehicle body when the vehicles are in a turning state. In the torsion-bar type stabilizer, each of right and left suspension arms that support wheels is connected to a torsion bar which is rotatably supported on a vehicle body. When strokes of the same direction are applied to the right and left suspension arms (when the strokes are "in-phase"), a spring force is not generated because there is no rotation of the torsion bar. On the other hand, when strokes of reverse direction are applied (when the strokes are "in anti-phase"), the spring force is generated by torsion of the torsion bar.

With this architecture discussed above, in a state where the vehicle moves in a linear direction, the spring force of the torsion bar becomes low thereby easily absorbing vibratory inputs from a road. On the contrary, in a state where the vehicle is in a turning state, the spring force is generated by torsion of the torsion bar so as to enhance roll stiffness, contributing to improvement of driving stability.

As disclosed in Japanese Patent Application Laid-Open No. 2005-178472 (hereinafter referred to as the patent document 1), the following stabilizer apparatus is known. A hydraulic cylinder is connected between a torsion bar and one of suspension arms. By locking or unlocking an operational rod of the hydraulic cylinder, transmission of spring force generated between the torsion bar and the suspension arm can be turned ON and OFF. With this architecture, it is possible to properly turn ON and OFF operation of the stabilizer according to vehicle driving conditions, contributing to better ride quality and driving stability.

In the hydraulic cylinder of the stabilizer apparatus disclosed in the patent document 1, a piston is slidably fitted into a cylinder in which a hydraulic liquid is filled, and a piston rod connected to the piston is extended outside from both end sides of the cylinder. Further, an opening and closing valve is provided at a communicating passage which communicates two cylinder chambers divided by the piston. With this architecture, by separating or communicating those two cylinder chambers by means of the opening and closing valve, it is possible to lock or unlock the stroke of the piston, and, that is, the piston rod.

As discussed above, since the piston rod is made extended from both end sides of the cylinder (a double rod structure), there is no volumetric change of the cylinder relative to the stroke of the piston rod, whereby no reservoir is necessary to be provided.

However, in the conventional stabilizer apparatus disclosed in the patent document 1, there are the following problems. That is, since the stabilizer is not provided with the reservoir, it becomes difficult to obtain temperature compensation for thermal expansion of the hydraulic liquid. In addition, since the stabilizer is structured as the double rod structure, the hydraulic cylinder may become too long.

SUMMARY OF THE INVENTION

The present invention has been made in light of the above problems, and it is an object of the present invention to provide a cylinder apparatus and a stabilizer apparatus using the same, which is a single rod structure where a piston rod is extended from one end portion of a cylinder so as to securely lock the piston rod and to enable temperature compensation.

In order to achieve the object described above, according to a first aspect of the present invention, there is a cylinder apparatus comprising: a cylinder containing a hydraulic liquid sealed therein; a piston slidably fitted within the cylinder so as to divide an interior of the cylinder into a first chamber and a second chamber; a piston rod, one end of which is connected to the piston and the other end of which is extended outside through the first chamber; an external cylinder provided at an outer periphery of the cylinder so as to form a reservoir between the cylinder and the external cylinder, the reservoir containing the hydraulic liquid and gas; a base valve dividing the second chamber and the reservoir; a first check valve provided with the piston so as to allow flow of the hydraulic liquid only from the second chamber side to the first chamber side; a second check valve provided with the base valve so as to allow flow of the hydraulic liquid only from the reservoir side to the second chamber side; a flow passage connecting the first chamber with the reservoir; and an opening and closing valve which opens and closes the flow passage, wherein the piston rod is fixable relative to the cylinder by closing the opening and closing valve.

According to a second aspect of the present invention, there is provided with a stabilizer apparatus in which one end of a torsion bar rotatably supported relative to a vehicle body is connected with one of a pair of a suspension member supporting right and left wheels, and the other end of the torsion bar is connected with the other of the pair of suspension member through a cylinder apparatus, the cylinder apparatus comprising: a cylinder containing a hydraulic liquid sealed therein; a piston slidably fitted within the cylinder so as to divide an interior of the cylinder into a first chamber and a second chamber; a piston rod, one end of which is connected to the piston and the other end of which is extended outside through the first chamber; an external cylinder provided at an outer periphery of the cylinder so as to form a reservoir between the cylinder and the external cylinder, the reservoir containing the hydraulic liquid and gas; a base valve dividing the second chamber from the reservoir; a first check valve provided with the piston so as to allow flow of the hydraulic liquid only from the second chamber side to the first chamber side; a second check valve provided with the base valve so as to allow flow of the hydraulic liquid only from the reservoir side to the second chamber side; a flow passage connecting the first chamber with the reservoir; and an opening and closing valve which opens and closes the flow passage.

According to a third aspect of the present invention, there is provided with a stabilizer apparatus in which one end of a torsion bar rotatably supported relative to a vehicle body is connected with one of a pair of a suspension member supporting right and left wheels, and the other end of the torsion bar is connected with the other of the pair of suspension member through a cylinder apparatus, the cylinder apparatus comprising: a cylinder containing a hydraulic liquid sealed therein; a piston slidably fitted within the cylinder so as to divide an interior of the cylinder into a first chamber and a second chamber; a piston rod, one end of which is connected to the piston and the other end of which is extended outside through the first chamber; an external cylinder provided at an outer periphery of the cylinder so as to form a reservoir between the cylinder and the external cylinder, the reservoir containing the hydraulic liquid and gas; a base valve dividing the second chamber and the reservoir; a separator tube provided within the external cylinder where the separator tube is fit onto the cylinder so as to form an annular oil passage between the separator tube and the cylinder; an oil passage connecting the first chamber with the annular oil passage; a first check valve provided with the piston so as to allow flow of the hydraulic liquid only from the second chamber side to the first chamber side; a second check valve provided with the base valve so as to allow flow of the hydraulic liquid only from the reservoir side to the second chamber side; a flow passage connecting the annular oil passage with the reservoir; an opening and closing valve which opens and closes the flow passage; a first opening provided on a lateral wall of the separator tube, the first opening communicating with the annular oil passage; a second opening provided on a lateral wall of the external cylinder, the second opening communicating with the reservoir, the second opening being faced to the first opening; wherein the opening and closing valve comprises within a case provided with the second opening: the flow passage connecting the first opening and the second opening; a valve body opening and closing the flow passage; and a solenoid actuator driving the valve body, and wherein an operation of the solenoid actuator is controlled by means of a controller according to running conditions of a vehicle.

In the cylinder apparatus according to the present invention, since the flow passage being directed from the cylinder side to the reservoir side can be separated by means of the opening and closing valve, it makes possible to securely lock the piston rod by incompressibility of the hydraulic liquid and to obtain temperature compensation for thermal expansion of the hydraulic liquid by means of compression-expansion of gas stayed in the reservoir.

DETAILED DESCRIPTION OF THE INVENTION

Hereinbelow, one embodiment of the present invention will be explained with reference to the accompanying figures.

Figure 1:
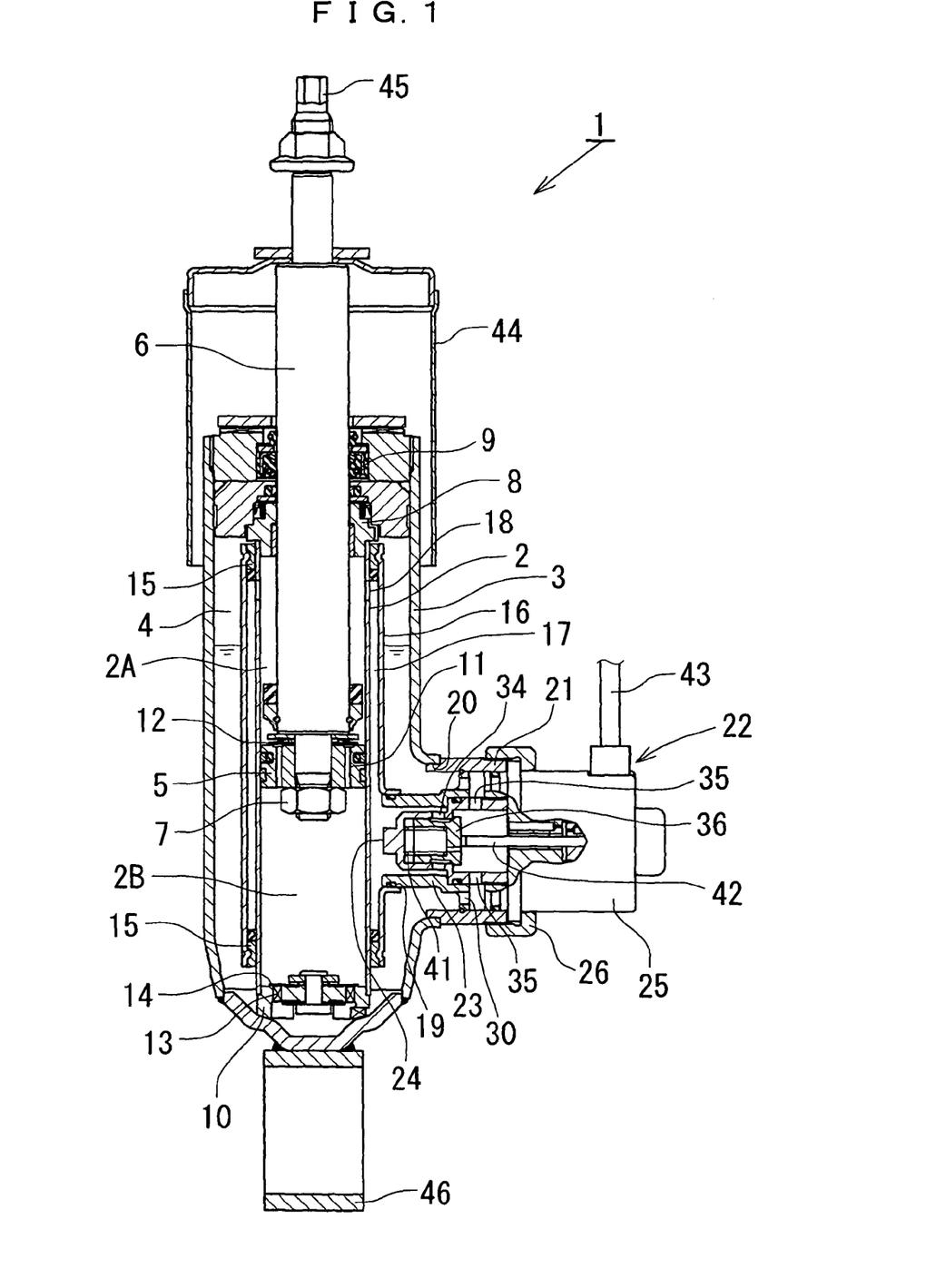
FIG. 1 is a longitudinal section of a cylinder apparatus according to an embodiment of the present invention.
Figure 2:
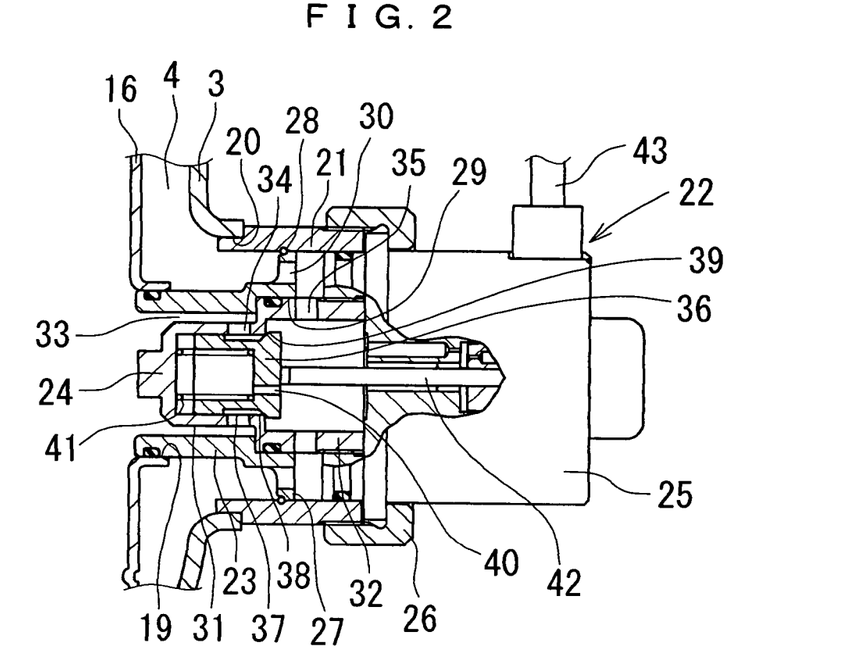
FIG. 2 is a longitudinal section expanding an electro-magnetic opening and closing valve of the cylinder apparatus according to FIG. 1.

The cylinder apparatus according to the embodiment of the present invention will be explained with reference to FIGS. 1 and 2. As shown in FIG. 1, a cylinder apparatus 1 is structured as a double cylindrical structure provided with an external cylinder 3 at an outer circumference of a cylinder 2, and a reservoir 4 is formed between the cylinder 2 and the external cylinder 3. In an interior of the cylinder 2, the piston 5 is slidably fitted, whereby the piston 5 divides the interior of the cylinder 2 into two chambers, that is, a cylinder upper chamber 2A (the first chamber) and a cylinder lower chamber 2B (the second chamber). One end of a piston rod 6 is connected with the piston 5 by means of a nut 7, and the other end of the piston rod 6 passes through the cylindrical upper chamber 2A and is inserted into a rod guide 8 and an oil seal 9 mounted on one end portion of the cylinder 2 and the external cylinder 3 thereby extended outside from one end portion of the cylinder 2. At a bottom end portion of the cylinder 2, a base valve 10 is provided so as to divide the cylinder lower chamber 2B from the reservoir 4.

The piston 5 is provided with a first oil passage 11 connecting between the cylinder upper chamber 2A and the cylinder lower chamber 2B. The first oil passage 11 is provided with a first check valve 12 which allows only flow of a hydraulic liquid directed from the cylinder lower chamber 2B side to the cylinder upper chamber 2A side. Further, the base valve 10 is provided with a second oil passage 13 connecting between the cylinder lower chamber 2B and the reservoir 4, and the second oil passage 13 is provided with a second check valve 14 which allows only flow of the hydraulic liquid directed from the reservoir 4 side to the cylinder lower chamber 2B side. The hydraulic liquid is enclosed within the interior of the cylinder 2, and the hydraulic liquid and gas are enclosed within the interior of the reservoir 4.

A separator tube 16 is fit onto the cylinder 2 through seal members 15, 15 each provided on both end portions of the cylinder 2, and an annular oil passage 17 is formed between the cylinder 2 and the separator tube 16, wherein the annular oil passage 17 is connected to the cylinder upper chamber 2A by means of a third oil passage 18 provided on a lateral wall of the cylinder 2. On a lateral wall of the separator tube 16, an opening 19 (the first opening) is provided. Moreover, on a lateral wall of the external cylinder 3, an opening 20 (the second opening), the diameter of which is larger than the one of the first opening 19, is coaxially provided relative to the first opening 19; the second opening 20 faces the first opening 19. A cylindrical case 21 is mounted on the second opening 20 by welding, etc. Further, on the case 21, an electro-magnetic opening and closing valve 22 (the opening-closing valve) is installed so as to open/close a flow passage between the annular oil passage 17 and the reservoir 4.

The electro-magnetic opening and closing valve 22 will be explained hereinafter with reference to the FIG. 2. As shown in FIG. 2, a passage member 23 and a guide member 24 are inserted into the case 21, and a solenoid actuator 25 is mounted on an opening portion of the case 21 by means of a nut 26 so as to fix the passage member 23 and the guide member 24. The passage member 23 is formed approximately into a cylindrical shape with a flange portion 27 on one end outer circumference thereof. The other end of the passage member 23 is inserted into the first opening 19 of the separator tube 16 to be sealed, and the flange portion 27 is fitted into the case 21. The passage member 23 is positioned in its axial direction by abutting the flange portion 27 against a stopper 28 mounted on an inner wall of the case 21. An inner circumference of an end portion of the passage member 23 (on the flange portion 27 side) is expanded in its diameter so as to form a diameter expanded portion 29. Further, a fourth oil passage 30 is passed through the flange portion 27 in its axial direction.

The guide member 24 comprising a small diameter portion 31 (sleeve) and a large diameter portion 32 is provided with a closed-end on the small diameter portion 31 side, thereby being formed into a stepped cylindrical shape. The small diameter portion 31 is inserted into the passage member 23 with a clearance, so that an annular oil chamber 33 communicating to the annular oil passage 17 is formed between the small diameter portion 31 and the passage member 23. Further, the large diameter portion 32 is fitted into the diameter expanded portion 29 of the passage member 23, whereby the guide member 24 is positioned in its axial direction by being abutted against a stepped portion of the passage member 23.

On a lateral wall of the small diameter portion 31 of the guide member 24, a first port 34 communicating to the oil chamber 33 is passed through. On the other hand, on a lateral wall of the large diameter portion 32 of the guide member 24, a second port 35 is passed through in such a manner as to connect with the reservoir 4 via the fourth oil passage 30 provided on the flange portion 27 of the passage member 23.

Within the small diameter portion 31 of the guide member 24, a valve member 36 (valve body), formed approximately into a closed-end cylindrical shape, is slidably fitted. On a lateral wall of the valve member 36, an outer peripheral groove 37 is formed so as to face the first port 34 of the guide member 24. An end portion of the valve member 36 (on the bottom portion side) is formed to have a diameter larger than an inner diameter of the small diameter portion 31 of the guide member 24, and a tapered seat face 38 formed on an end portion of the outer peripheral groove 37 (on the large diameter side) is adapted to abut against (or sit on) a seat portion 39 formed on an end rim of the small diameter portion 31 of the guide member 24 (on the inner circumference side). On the bottom of the valve member 36, a pressure balance passage 40 is passed through.

Between the inner side of the bottom of the valve member 36 and the bottom of the guide member 24, a spring 41 (a compressed spring) is interposed, and on the outer side of the bottom of the valve member 36, an operational rod 42 of the solenoid actuator 25 is abutted. By electrifying a coil (not shown) through a lead wire 43, the solenoid actuator 25 generates thrust force so as to extend the operational rod 42. Moreover, the valve member 36 is normally shifted to the solenoid actuator 25 side by means of the spring force of the spring 41 so as to separate the seat face 38 from the seat portion 39 thereby connecting between the first and second ports 34, 35. On the other hand, against the spring force of the spring 41 by means of the operational rod 42 of the solenoid actuator 25, the valve member 36 is shifted to bottom side of the guide member 24 so as to abut the seat face 38 to (or sit on) the seat portion 39 thereby intercepting the interval between the first and second ports 34, 35.

The piston rod 6 is provided with a closed-end, cylindrical dust cover 44. Further, the tip of the piston rod 6 is provided with a mounting portion 45 while the bottom end portion of the external cylinder 3 is provided with a mounting eye 46.

Functions of the cylinder apparatus 1 discussed hereinabove will be explained. In the cylinder apparatus 1, when the piston rod 6 is extended, the first check valve 12 of the piston 5 is closed by stroking the piston 5 in the cylinder 2. Accordingly, the hydraulic liquid on the cylinder upper chamber 2A side is pressurized so as to flow toward the annular oil chamber 33 of the electro-magnetic opening and closing valve 22 through the third oil passage 18 and the annular oil passage 17. Further, by passing from the annular oil chamber 33 to the first port 34, the second port 35 and the fourth oil passage 30, the hydraulic liquid flows into the reservoir 4. Here, the hydraulic liquid for an amount that the piston 5 strokes flows from the reservoir 4 to the cylinder lower chamber 2B by opening the second check valve 14 of the base valve 10. At the same time, gas within the reservoir 4 is expanded for an amount that the piston rod 6 withdraws from the cylinder 2, whereby volumetric change within the cylinder 2 can be compensated.

On the contrary, when the piston rod 6 is contracted, the first check valve 12 of the piston 5 is opened by sifting the piston 5 in the cylinder 2 thereby closing the second check valve 14 of the base valve 10. Accordingly, the hydraulic liquid within the cylinder lower chamber 2B flows into the cylinder upper chamber 2A whereby the hydraulic liquid for an amount that the piston rod 6 is inserted into the cylinder 2 flows from the cylinder upper chamber 2A to the reservoir 4 passing through the identical paths where the piston rod 6 is extended. Here, since gas within the reservoir 4 is compressed for an amount that the piston rod 6 is inserted into the cylinder 2, volumetric change within the cylinder 2 can be compensated.

In a state where the solenoid actuator 25 is not electrified, the valve member 36 is shifted toward the solenoid actuator 25 side by means of urging force of the spring 41, whereby the seat face 38 is separated from the seat portion 39 so as to connect the first and second ports 34, 35. Since flow of the hydraulic liquid from the cylinder upper chamber 2A side to the reservoir 4 side is allowed, it makes possible for the piston rod 6 to be freely extended or contracted.

By electrifying the solenoid actuator 25 to operate, the valve member 36 is shifted against the urging force of the spring 41 so as to abut the seat face 38 against the seat portion 39 thereby intercepting the interval between the first and second ports 34 and 35. Accordingly, since flow of the hydraulic liquid directing from the cylinder upper chamber 2A side to the reservoir 4 side is prohibited, the piston rod 6 is locked relative to any expansion-contraction direction.

Here, force making the piston rod 6 stroked in either expansion-contraction direction will function as compressed force relative to the hydraulic liquid filled in a flow passage being from the cylinder 2 to the electro-magnetic opening and closing valve 22, whereby strokes of the piston rod 6 can be securely locked by means of incompressibility of the hydraulic liquid.

In the electro-magnetic opening and closing valve 22, when the electro-magnetic opening and closing valve 22 is closed, pressure of the hydraulic liquid affecting an area from the first port 34 to the valve member 36 works on both end portions of the outer peripheral groove 37 of the valve member 36. Since the both end portions of the outer peripheral groove 37 have identical pressure receiving areas, the pressure keeps its balance thereby not generating any force making the valve member 36 shifted. Accordingly, spring force of the spring 41 and thrust force of the solenoid actuator 25 can be minimized, contributing to downsizing and less energy consumption. Here, in the present embodiments, the electro-magnetic opening and closing valve 22 is structured as a normally opened valve which closes the valve when electrified; however, it may be a normally closed valve which opens when electrified. In case that control stability is a first priority among others in failure of the electro-magnetic opening and closing valve 22, the normally closed valve discussed above may be a better choice.

In the valve member 36, a flow passage is intercepted by abutting the tapered seat face 38 against the seat portion 39 (the stepped portion), it can minimize leakage of the hydraulic liquid, whereby the piston rod 6 can be securely locked. Here, in the present embodiments, when the electro-magnetic opening and closing valve 22 is closed, it designs that no leakage occurs; however, as long as the stabilizer apparatus can obtain necessary locking force, it is possible to design that certain leakage may occur. A tolerative amount of the leakage, although depending on car models, ride qualities or temperature compensations, may be, for example, from Orifice Diameter: φ0.1 to φ0.95.

Further, since the reservoir 4 is provided, it is possible to compensate volumetric change within the cylinder 2 due to the extension-contraction of the piston rod 6 and volumetric change of the hydraulic liquid due to thermal expansion, by means of compression and expansion of gas within the reservoir 4.

Next some alternative examples of the present embodiments will be explained with reference to FIGS. 3 to 5. Any components identical with or corresponding to those of the aforementioned first and second embodiments are denoted by the same reference numerals, and descriptions will be given only to elements not having been explained.

Figure 3:
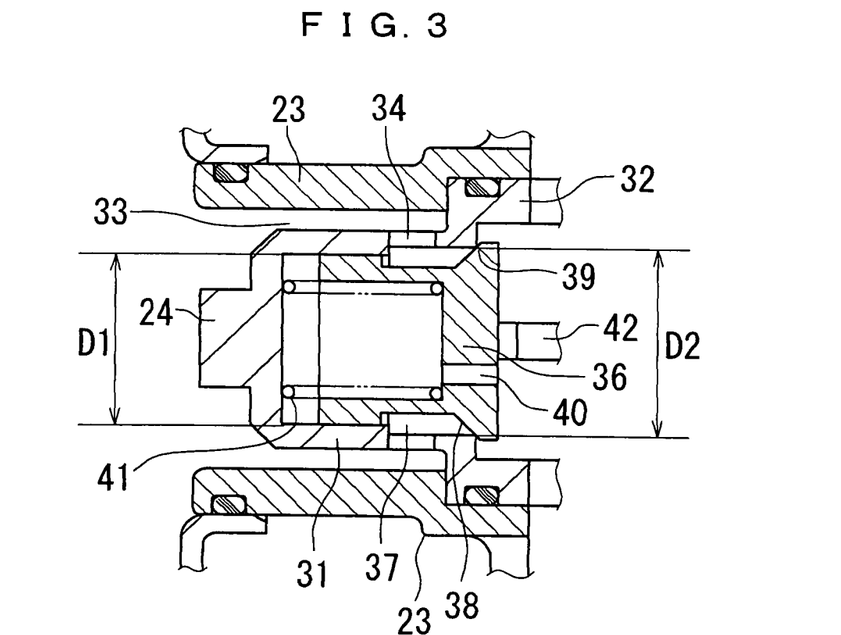
FIG. 3 is a longitudinal section expanding a main portion of the electro-magnetic opening and closing valve according to the modified cylinder apparatus of FIG. 1.
Figure 4:
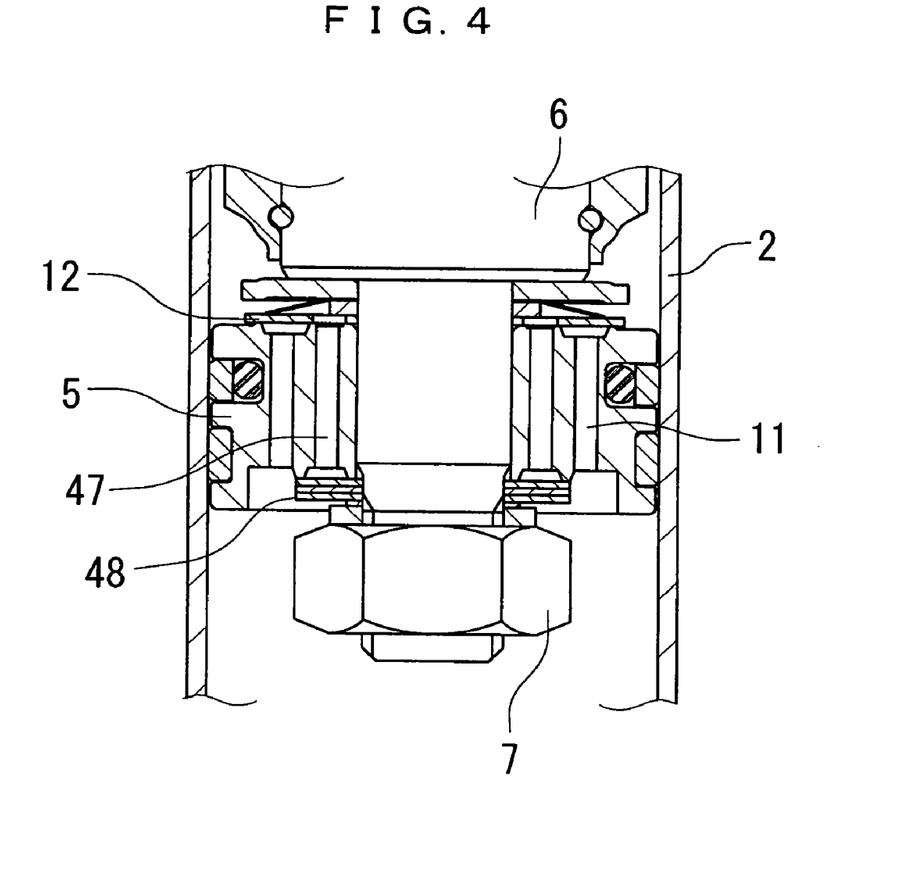
FIG. 4 is a longitudinal section expanding a piston according to another modified cylinder apparatus of FIG. 1.

In the alternative example shown in FIG. 3, the inner peripheral portion of the small diameter portion 31 of the guide member 24 is formed with an expanded diameter portion (inner diameter D2>D1) expanded on the large diameter portion 32 side relative to the bottom portion side (inner diameter D1) which guides the valve member 36. Accordingly, pressure receiving areas of both end portions of the outer peripheral groove 37 of the valve member 36 relative to pressure of the hydraulic liquid of the first port 34 are enlarged on the seat face 38.

With the above architecture, when the first port 34 is pressurized when the valve member 36 is closed, force to open the valve member 36 is generated due to differential pressure receiving areas of the both end portions of the outer peripheral groove 37. In case that the force to open the valve member 36 is greater than thrust force of the solenoid actuator 25, the valve member 36 is opened. Based on this, when pressure within the cylinder 2 reaches to a given pressure, the electro-magnetic opening and closing valve 22 is opened so as to send the pressure to the reservoir 4 thereby preventing the pressure in the cylinder 2 from being raised too high.

Next, the other alternative examples will be explained with reference to FIGS. 4 and 5. In FIG. 4, the piston 5 is provided with an extension relief passage 47 connecting the cylinder upper chamber 2A with the cylinder lower chamber 2B. Further, the extension relief passage 47 is provided with a normally-closed extension relief valve 48 (the first relief valve). When the pressure within the cylinder upper chamber 2A reaches to a given pressure, the extension relief valve 47 is opened so as to send the pressure to the cylinder lower chamber 2B.

Figure 5:
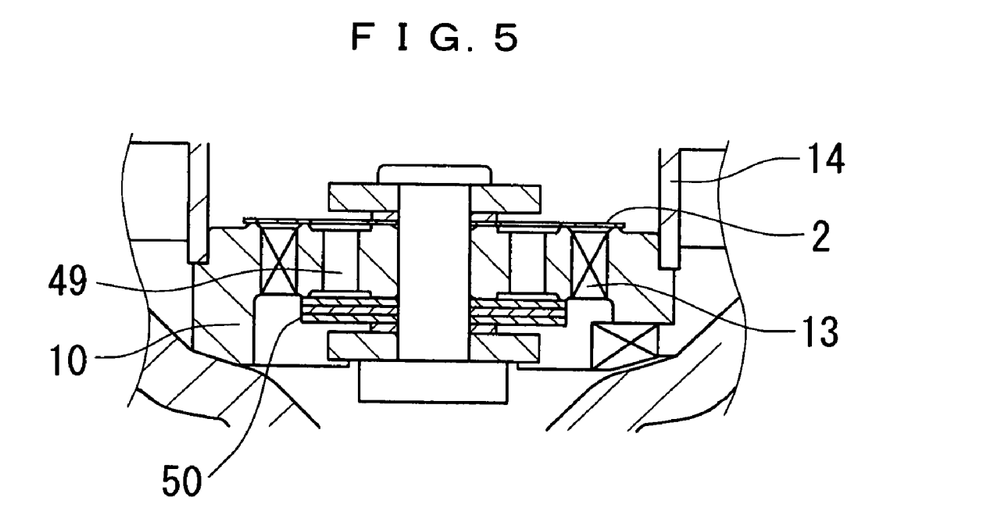
FIG. 5 is a longitudinal section expanding a base valve according to yet another modified cylinder apparatus of FIG. 1.

Furthermore, as shown in FIG. 5, the base valve 10 is provided with a contraction relief passage 49 connecting the cylinder lower chamber 2B with the reservoir 4. The contraction relief passage 49 is provided with a normally-closed contraction relief valve 50 (the second relief valve). When the pressure within the cylinder lower chamber 2B reaches to a given pressure, the contraction relief valve 50 is opened so as to send the pressure to the reservoir 4.

Based on the above architecture, when the pressure within the cylinder upper chamber 2A reaches to a given pressure based on force in which to extend the piston rod 6, the extension relief valve 48 of the piston 5 is opened so as to send the pressure to the cylinder lower chamber 2B. On the other hand, when the pressure within the cylinder lower chamber 2B reaches to a given pressure based on force in which to contract the piston rod 6, the contraction relief valve 50 of the base valve 10 is opened so as to send the pressure to the reservoir 4. Accordingly, excessive rise of pressure within the cylinder 2 can be prevented.

Figure 6:
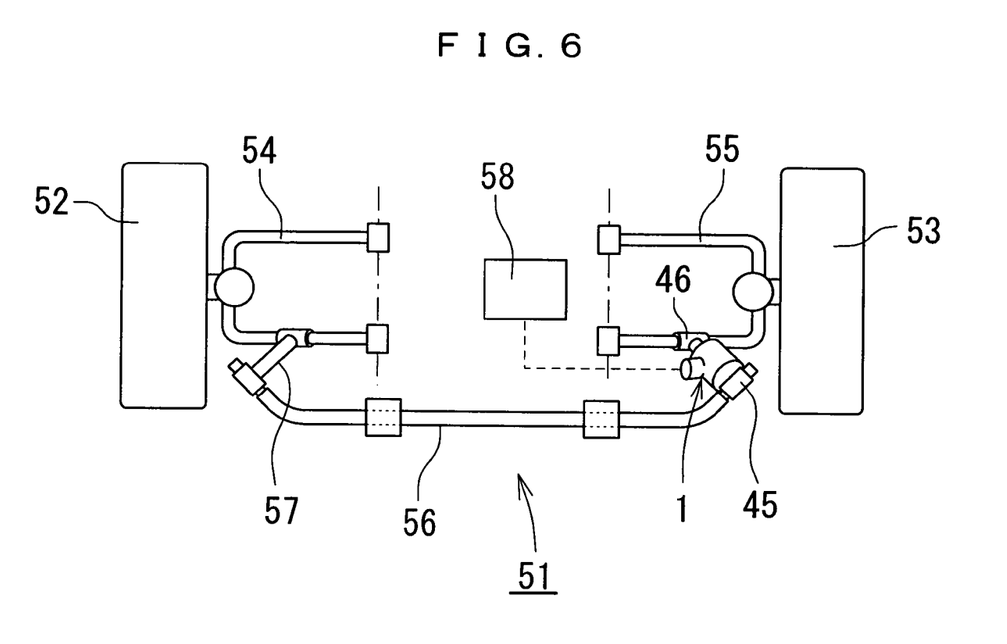
FIG. 6 is a plane view showing a schematic structure of a stabilizer apparatus into which the cylinder apparatus of FIG. 1 is installed.

Next, the stabilizer apparatus to which the cylinder apparatus 1 is installed will be explained hereinafter with reference to FIG. 6. As shown in FIG. 6, in a stabilizer apparatus 51, a pair of suspension arms 54, 55 (suspension member) supporting right and left wheels 52, 53 are connected to each other by means of a torsion bar 56 extended in a vehicle width direction. The torsion bar 56 is rotatably supported relative to a vehicle body (not shown). One end side of the torsion bar 56 is connected to the suspension arm 54 via a link bracket 57 while the other end side thereof is connected to the suspension arm 55 via the cylinder apparatus 1. Here, the other end side of the torsion bar 56 is connected to the mounting portion 45 of the piston rod 6 of the cylinder apparatus 1. On the other hand, the mounting eye 46 placed at the bottom end portion of the external cylinder 3 of the cylinder apparatus 1 is connected to the suspension arm 55.

The lead wire 43 of the solenoid actuator 25 in the cylinder apparatus 1 is connected to a controller 58. Based on several sensors (not shown) such as acceleration sensors or steering angle sensors to determine vehicle conditions, the controller 58 outputs control current to the solenoid actuator 25 via the lead wire 43 according to driving conditions of the vehicle thereby controlling open/close of the electro-magnetic opening and closing valve 22.

According to the architecture discussed above, when the electro-magnetic opening and closing valve 22 is opened, the expansion and contraction of the piston rod 6 of the cylinder apparatus 1 is allowed whereby spring force of the torsion bar 56 is not generated to strokes of the suspension arms 54, 55; that is, the torsion bar 56 is not operated as stabilizer. On the other hand, when the electro-magnetic opening and closing valve 22 is closed, the piston rod 6 of the cylinder apparatus 1 is locked whereby the right and left suspension arms 54, 55 are connected to each other by means of the torsion bar 56; that is, the torsion bar 56 is operated as the stabilizer. Based on the above, it is possible to properly turn ON or OFF the operation of the stabilizer by means of the controller 58, according to driving conditions of the vehicle, thereby improving ride quality and driving stability.

Here, in the embodiments of the present invention, the separator tube 16 is applied in order to form the flow passages; however, on the side of the electro-magnetic opening and closing valve 22 within the reservoir 4, it is possible to provide a fine tube connecting between the oil passage 18 and the interior of the passage member 23.

Further, the cylinder apparatus 1 of the present invention may be provided on two places of the torsion bar 56.

What is claimed is:

1. A cylinder apparatus comprising:
    a cylinder containing a hydraulic liquid sealed therein;
    a piston slidably fitted within the cylinder so as to divide an interior of the cylinder into a first chamber and a second chamber;
    a piston rod, one end of which is connected to the piston and the other end of which is extended outside through the first chamber;
    an external cylinder provided at an outer periphery of the cylinder so as to form a reservoir between the cylinder and the external cylinder, the reservoir containing the hydraulic liquid and gas;
    a base valve dividing the second chamber from the reservoir;
    a first check valve provided with the piston so as to allow flow of the hydraulic liquid only from the second chamber side to the first chamber side;
    a second check valve provided with the base valve so as to allow flow of the hydraulic liquid only from the reservoir side to the second chamber side;
    a sole flow passage connecting the first chamber with the reservoir; and
    an electro-magnetic opening and closing valve which opens and closes the flow passage,
    wherein, when the electro-magnetic opening and closing valve is opened, the piston connected to the piston rod is slidably movable in the cylinder and, when the electro-magnetic opening and closing valve is closed, the piston connected to the piston rod is immovable in the cylinder.

2. The cylinder apparatus according to claim 1, wherein the opening and closing valve comprises: a cylindrical sleeve having a port constituting the flow passage, the port being provided on a lateral wall of the sleeve; and a valve body slidably fitted into the sleeve and is provided with an outer peripheral groove facing the port, and wherein a seat face formed at one end portion of the outer peripheral groove is seated on or unseated from a seat portion formed on an end rim of the sleeve so as to open and close the port.

3. The cylinder apparatus according to claim 2, wherein the seat face is tapered.

4. The cylinder apparatus according to claim 2, wherein, in the opening and closing valve, pressure receiving areas at both end portions of the outer peripheral groove are identical relative to pressure on the port side.

5. The cylinder apparatus according to claim 2, wherein, in the opening and closing valve, pressure receiving areas at both end portions of the outer peripheral groove are designed so that one end portion of the outer peripheral groove is larger than the other side thereof relative to pressure on the port side.

6. The cylinder apparatus according to claim 2, wherein the opening and closing valve is an electro-magnetic opening and closing valve where the valve body is driven by a solenoid actuator.

7. The cylinder apparatus according to claim 2, wherein a separator tube is provided within the external cylinder where the separator tube is fit onto the cylinder so as to form the flow passage between the separator tube and the cylinder;
a first opening is provided on a lateral wall of the separator tube, the first opening communicating with the flow passage; a second opening is provided on a lateral wall of the external cylinder, the second opening communicating with the reservoir, the second opening being faced to the first opening; and the opening and closing valve is designed so that the sleeve and the valve body is inserted within a case attached to the second opening, and the first opening and the second opening are connected with each other through the port.

8. The cylinder apparatus according to claim 1, wherein the piston is provided with a normally-closed first relief valve so that, when pressure within the first chamber reaches a certain pressure, the first relief valve is opened so as to send the pressure to the second chamber in order to prevent excessive rise of pressure within the cylinder; and the base valve is provided with a normally-closed second relief valve so that, when pressure within the second chamber reaches a certain pressure, the second relief valve is opened so as to send the pressure to the reservoir in order to prevent excessive rise of pressure within the cylinder.

9. A stabilizer apparatus comprising:
a cylinder apparatus according to claim 1, the stabilizer apparatus further comprising a torsion bar and a pair of suspension members, wherein:
one end of the torsion bar rotatably supported relative to a vehicle body, the one end of the torsion bar is connected with one of the pair of the suspension members that support right and left wheels, and the other end of the torsion bar is connected with the other of the pair of the suspension members through the cylinder apparatus.

10. The stabilizer apparatus according to claim 9, wherein the opening and closing valve comprises: a cylindrical sleeve having a port constituting the flow passage, the port being provided on a lateral wall of the sleeve; and a valve body slidably fitted into the sleeve and is provided with an outer peripheral groove facing the port, and wherein a seat face formed at one end portion of the outer peripheral groove is seated on or unseated from a seat portion formed on an end rim of the sleeve so as to open and close the port.

11. The stabilizer apparatus according to claim 10, wherein, in the opening and closing valve, pressure receiving areas at both end portions of the outer peripheral groove are identical relative to pressure on the port side.

12. The stabilizer apparatus according to claim 10, wherein, in the opening and closing valve, pressure receiving areas at both end portions of the outer peripheral groove are designed so that one end portion of the outer peripheral groove is larger than the other side thereof relative to pressure on the port side.

13. The stabilizer apparatus according to claim 9, wherein the opening and closing valve is an electro-magnetic opening and closing valve where the valve body is driven by a solenoid actuator.

14. The stabilizer apparatus according to claim 10, wherein a separator tube is provided within the external cylinder where the separator tube is fit onto the cylinder so as to form the flow passage between the separator tube and the cylinder;
a first opening is provided on a lateral wall of the separator tube, the first opening communicating with the flow passage; a second opening is provided on a lateral wall of the external cylinder, the second opening communicating with the reservoir, the second opening being faced to the first opening; and the opening and closing valve is designed so that the sleeve and the valve body is inserted within a case attached to the second opening, and the first opening and the second opening are connected with each other through the port.

15. The stabilizer apparatus according to claim 9, wherein the piston is provided with a normally-closed first relief valve so that, when pressure within the first chamber reaches a certain pressure, the first relief valve is opened so as to send the pressure to the second chamber in order to prevent excessive rise of pressure within the cylinder; and the base valve is provided with a normally-closed second relief valve so that, when pressure within the second chamber reaches a certain pressure, the second relief valve is opened so as to send the pressure to the reservoir in order to prevent excessive rise of pressure within the cylinder.

16. A stabilizer apparatus comprising:
a cylinder apparatus according to claim 1, the stabilizer apparatus further comprising a torsion bar and a pair of suspension members, wherein:
the torsion bar is rotatably supported relative to a vehicle body, one end of the torsion bar is connected with one of the pair of the suspension members that support right and left wheels, and the other end of the torsion bar is connected with the other of the pair of the suspension members through the cylinder apparatus wherein said cylinder apparatus further comprising:
a separator tube provided within the external cylinder where the separator tube is fit onto the cylinder so as to form an annular oil passage between the separator tube and the cylinder;
an oil passage connecting the first chamber with the annular oil passage;
the flow passage connecting the annular oil passage with the reservoir;
a first opening provided on a lateral wall of the separator tube, the first opening communicating with the annular oil passage;

a second opening provided on a lateral wall of the external cylinder, the second opening communicating with the reservoir, the second opening being faced to the first opening;

wherein the opening and closing valve comprises within a case provided with the second opening: the flow passage connecting the first opening and the second opening; a valve body opening and closing the flow passage; and a solenoid actuator driving the valve body, wherein an operation of the solenoid actuator is controlled by means of a controller according to running conditions of a vehicle.

17. The stabilizer apparatus according to claim 16, wherein the opening and closing valve comprises: a cylindrical sleeve having a port constituting the flow passage, the port being provided on a lateral wall of the sleeve; and a valve body slidably fitted into the sleeve and is provided with an outer peripheral groove facing the port, and wherein a seat face formed at one end portion of the outer peripheral groove is seated on or unseated from a seat portion formed on an end rim of the sleeve so as to open and close the port.

18. The stabilizer apparatus according to claim 17, wherein, in the opening and closing valve, pressure receiving areas at both end portions of the outer peripheral groove are identical relative to pressure on the port side.

19. The stabilizer apparatus according to claim 17, wherein, in the opening and closing valve, pressure receiving areas at both end portions of the outer peripheral groove are designed so that one end portion of the outer peripheral groove is larger than the other side thereof relative to pressure on the port side.

20. The stabilizer apparatus according to claim 16, wherein the piston is provided with a normally-closed first relief valve so that, when pressure within the first chamber reaches a certain pressure, the first relief valve is opened so as to send the pressure to the second chamber in order to prevent excessive rise of pressure within the cylinder apparatus; and the base valve is provided with a normally-closed second relief valve so that, when pressure within the second chamber reaches a certain pressure, the second relief valve is opened so as to send the pressure to the reservoir in order to prevent excessive rise of pressure within the cylinder apparatus.

21. A stabilizer apparatus according to claim 9, wherein a hydraulic liquid leakage is possible when the opening and closing valve is closed to the extent that the stabilizer apparatus obtains a necessary locking force.

* * * * *